United States Patent
Breese et al.

(10) Patent No.: US 6,368,225 B1
(45) Date of Patent: Apr. 9, 2002

(54) AXIALLY COLLAPSIBLE DRIVESHAFT ASSEMBLY AND METHOD OF MANUFACTURING SAME

(75) Inventors: Douglas E. Breese, Northwood, OH (US); James A. Duggan, Temperance, MI (US)

(73) Assignee: Spicer Driveshaft, Inc., Holland, OH (US)

( * ) Notice: Subject to any disclaimer, the term of this patent is extended or adjusted under 35 U.S.C. 154(b) by 0 days.

(21) Appl. No.: 09/476,472

(22) Filed: Dec. 30, 1999

(51) Int. Cl.$^7$ ................................................ F16C 3/00
(52) U.S. Cl. ................... 464/183; 285/382.2; 403/278; 403/359.6
(58) Field of Search ............................... 464/162, 182, 464/183; 403/274, 278, 282, 359.1, 359.5, 359.6; 29/507, 508, 521; 285/382, 382.2; 280/777; 74/492

(56) References Cited

U.S. PATENT DOCUMENTS

| | | | |
|---|---|---|---|
| 845,156 A | * 2/1907 | Winchester | .................. 403/282 |
| 1,220,483 A | 3/1917 | Williams et al. | |
| 2,089,168 A | * 8/1937 | Brown | ................ 403/359.5 X |
| 2,217,188 A | 10/1940 | Snyder | |
| 2,344,425 A | 3/1944 | Snyder | |
| 2,992,548 A | 7/1961 | Walterscheid-Muller et al. | |
| 3,112,627 A | * 12/1963 | Gissel | ......................... 464/162 |
| 3,358,520 A | * 12/1967 | Heydlauf et al. | ........ 464/162 X |
| 4,008,845 A | * 2/1977 | Bleckmann | ............... 29/521 X |
| 4,535,645 A | 8/1985 | De Bisschop et al. | |
| 4,807,351 A | * 2/1989 | Berg et al. | ........... 403/359.6 X |
| 5,477,750 A | * 12/1995 | Korzan | .................... 280/777 X |
| 5,645,366 A | * 7/1997 | Ishibashi et al. | ........ 464/162 X |
| 5,674,026 A | 10/1997 | Ishibashi et al. | |
| 5,709,605 A | 1/1998 | Riefe et al. | |

FOREIGN PATENT DOCUMENTS

| | | | |
|---|---|---|---|
| GB | 649440 A | * 1/1951 | .............. 403/359.5 |
| GB | 2208313 | 3/1989 | |
| JP | 9267754 | 10/1977 | |

* cited by examiner

Primary Examiner—Lynne H. Browne
Assistant Examiner—Greg Binda
(74) Attorney, Agent, or Firm—MacMillan, Sobanski & Todd, LLC

(57) ABSTRACT

A driveshaft assembly for use in a drive train system includes an inner driveshaft tube section including an end portion having an outer surface and an outer driveshaft tube section including an end portion having an inner surface. A plurality of axially extending wires is positioned on either the outer surface of the inner driveshaft tube section or on the inner surface of the outer driveshaft tube section. Then, the end portion of the outer driveshaft tube section is disposed about the end portion of the inner driveshaft tube section so as to define an overlapped region therebetween. At least one of the end portions of the inner and outer driveshaft tube sections is then deformed so as to compress the wires therebetween. As a result, recesses are formed in the outer surface of the inner driveshaft tube section and in the inner surface of the outer driveshaft tube section. The wires cooperate with the recesses to prevent relative axial and rotational movement between the inner driveshaft tube section and the outer driveshaft tube section during normal operating conditions.

19 Claims, 5 Drawing Sheets

AXIALLY COLLAPSIBLE DRIVESHAFT ASSEMBLY AND METHOD OF MANUFACTURING SAME

BACKGROUND OF THE INVENTION

This invention relates in general to drive train systems for transferring rotational power from a source of rotational power to a rotatably driven mechanism. In particular, this invention relates to an improved driveshaft assembly for use in such a drive train system that is axially collapsible in the event of a collision to absorb energy and a method for manufacturing same.

Torque transmitting shafts are widely used for transferring rotational power from a source of rotational power to a rotatably driven mechanism. For example, in most land vehicles in use today, a drive train system is provided for transmitting rotational power from an output shaft of an engine/transmission assembly to an input shaft of an axle assembly so as to rotatably drive the wheels of the vehicle. To accomplish this, a typical vehicular drive train system includes a hollow cylindrical driveshaft tube. A first universal joint is connected between the output shaft of the engine/transmission assembly and a first end of the driveshaft tube, while a second universal joint is connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of misalignment between the rotational axes of these three shafts.

A recent trend in the development of passenger, sport utility, pickup truck, and other vehicles has been to design the various components of the vehicle in such a manner as to absorb energy during a collision, thereby providing additional safety to the occupants of the vehicle. As a part of this trend, it is known to design the drive train systems of vehicles so as to be axially collapsible so as to absorb energy during a collision. To accomplish this, the driveshaft tube may be formed as an assembly of first and second driveshaft sections that are connected together for concurrent rotational movement during normal operation, yet are capable of moving axially relative to one another when a relatively large axially compressive force is applied thereto, such as can occur during a collision. A variety of such axially collapsible driveshaft assemblies are known in the art.

It has been found to be desirable to design axially collapsible driveshaft assemblies of this general type such that a predetermined amount of force is required to initiate the relative axial movement between the two driveshaft sections. It has further been found to be desirable to design these axially collapsible driveshaft assemblies such that a predetermined amount of force (constant in some instances, varying in others) is required to maintain the relative axial movement between the two driveshaft sections. However, it has been found that the manufacture of such axially collapsible driveshaft assemblies is somewhat difficult and expensive to manufacture than convention non-collapsible driveshafts. Thus, it would be desirable to provide an improved method of manufacturing a driveshaft assembly for use in a drive train system that is relatively simple and inexpensive to perform.

SUMMARY OF THE INVENTION

This invention relates to an improved structure for a driveshaft assembly for use in a drive train system that is relatively simple and inexpensive to perform. An inner driveshaft tube section is provided including an end portion having an outer surface. Similarly an outer driveshaft tube section is provided including an end portion having an inner surface. A plurality of axially extending wires is positioned on either the outer surface of the inner driveshaft tube section or on the inner surface of the outer driveshaft tube section. Then, the end portion of the outer driveshaft tube section is disposed about the end portion of the inner driveshaft tube section so as to define an overlapped region therebetween. At least one of the end portions of the inner and outer driveshaft tube sections is then deformed so as to compress the wires therebetween. As a result, recesses are formed in the outer surface of the inner driveshaft tube section and in the inner surface of the outer driveshaft tube section. The wires cooperate with the recesses to prevent relative axial and rotational movement between the inner driveshaft tube section and the outer driveshaft tube section during normal operating conditions. However, when a relatively large axial force is applied to the ends of the telescoping driveshaft, the inner driveshaft tube section will move axially within the outer driveshaft tube section, thereby collapsing and absorbing energy.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
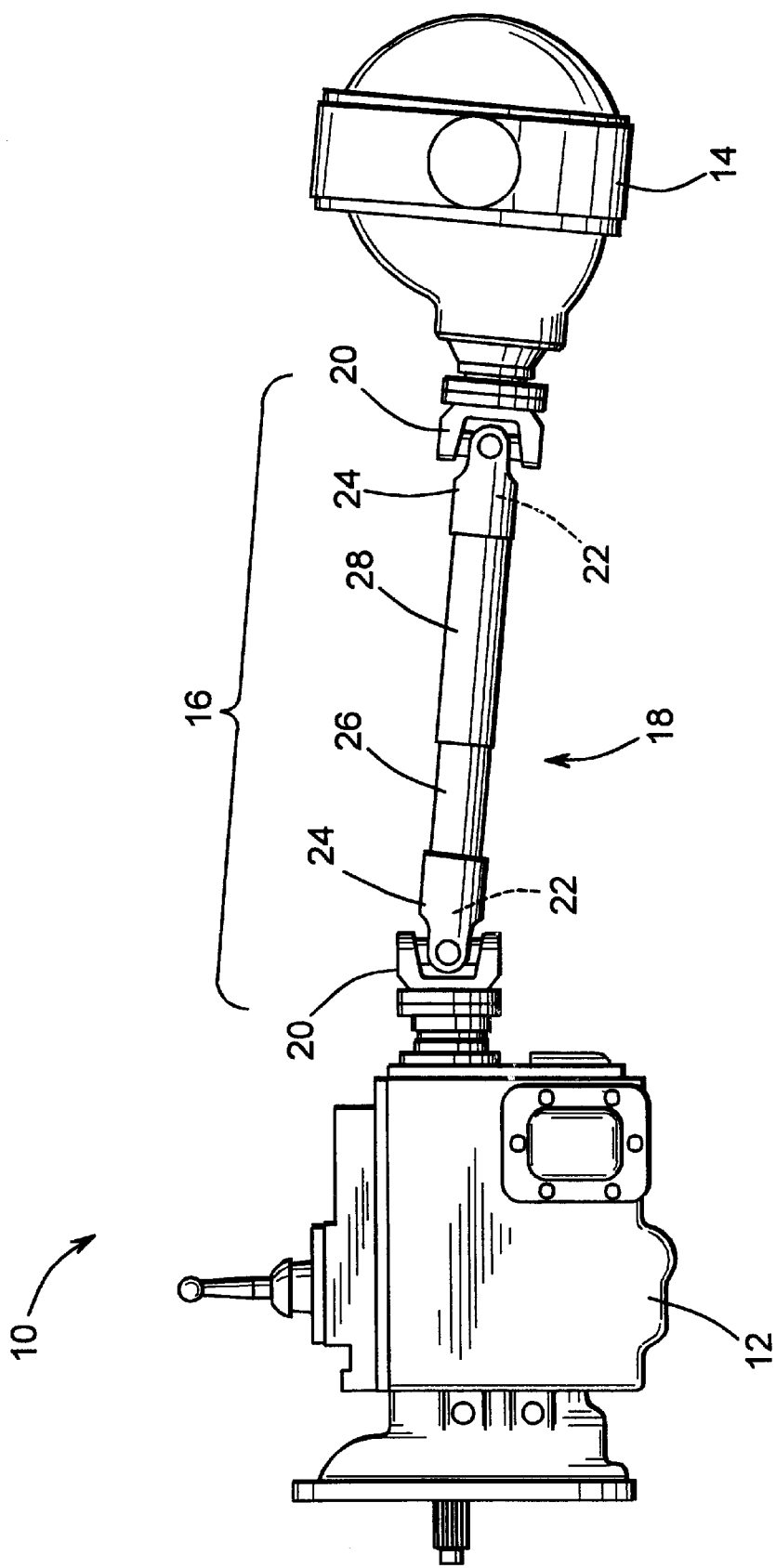
FIG. 1 is a side elevational view of a vehicle drive train system including an axially collapsible driveshaft assembly in accordance with the invention.

Referring now to the drawings, there is illustrated in FIG. 1 a vehicle drive train system, indicated generally at 10, that is generally conventional in the art. The drive train system 10 includes a transmission 12 including an output shaft (not shown) that is connected to an input shaft (not shown) of an axle assembly 14 through a driveshaft assembly 16. The driveshaft assembly 16 includes a collapsible driveshaft, indicated generally at 18, in accordance with this invention. As is typical in vehicle drive train systems 10, the transmission output shaft and the axle assembly input shaft are not co-axially aligned. Therefore, universal joints 20 are provided at front and rear ends 22 of the driveshaft 18 to rotatably connect the driveshaft 18 at an angle to the output shaft of the transmission 12 and the input shaft of the axle assembly 14. The connections between the ends 22 of the driveshaft 18 and the universal joints 20 are usually accomplished by end fittings 24 attached to the ends 22 of the driveshaft 18, such as tube yokes or slip yokes.

Figure 2:
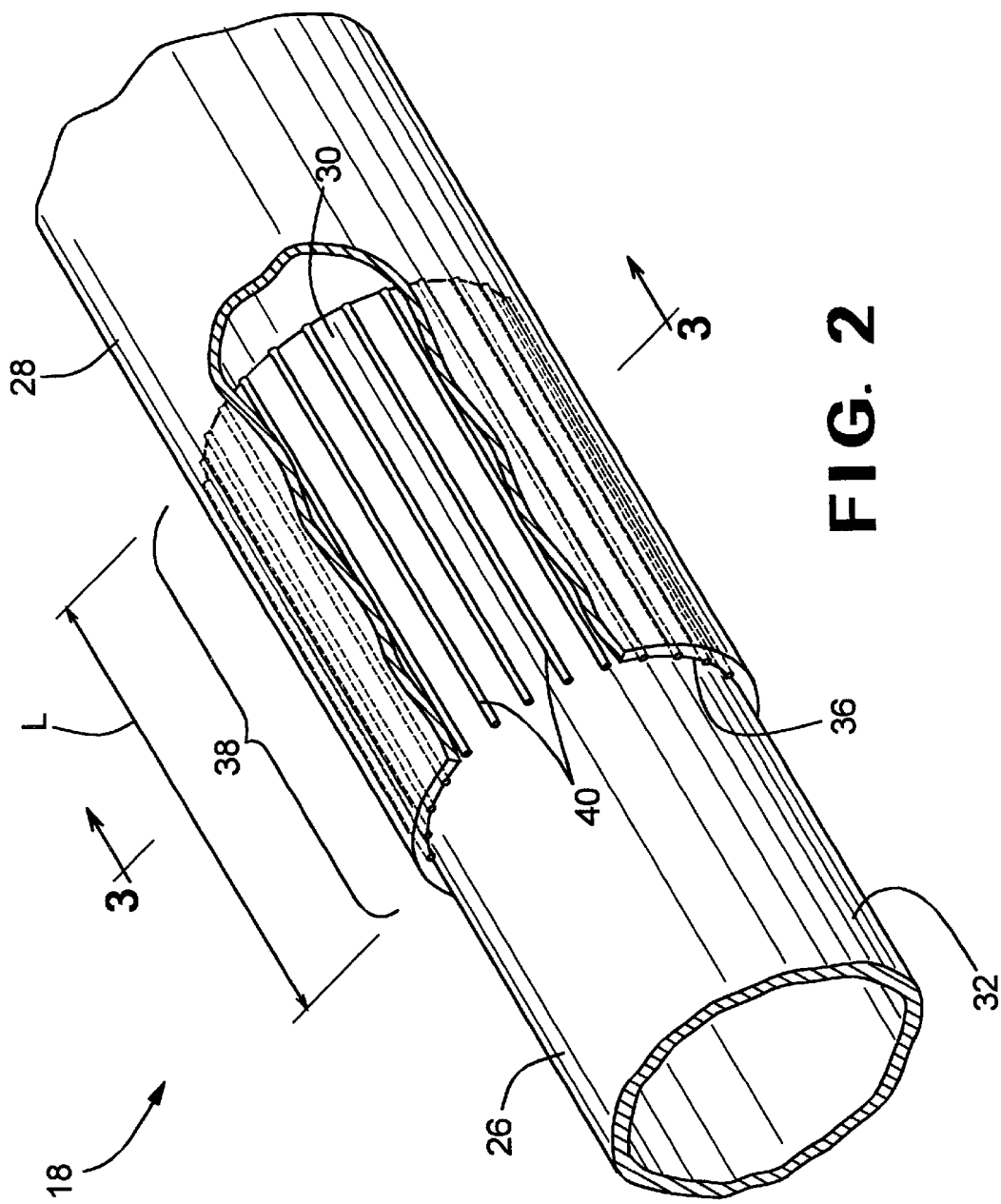
FIG. 2 is a perspective view, partially broken away, of a portion of the axially collapsible driveshaft assembly illustrated in FIG. 1.

As best shown in FIG. 2, the collapsible driveshaft 18 of this invention is an assembly including an inner driveshaft tube section 26 and an outer driveshaft tube section 28. Preferably, both the inner driveshaft tube section 26 and the outer driveshaft tube section 28 are elongated and cylindrical in shape. The inner driveshaft tube section 26 includes an end portion 30 having an outer surface 32. Similarly, the outer driveshaft tube section 28 includes an end portion 34 having an inner surface 36. The inner driveshaft tube section 26 and the outer driveshaft tube section 28 can be formed from any suitable materials. Typically, both the inner driveshaft tube section 26 and the outer driveshaft tube section 28 are formed from aluminum alloy or steel. However, other materials, such as fiber reinforced composites or other combinations of metallic or non-metallic materials, can also be used. Suitable methods for forming the inner driveshaft tube section 26 and the outer driveshaft tube section 28 are well known to persons skilled in the art.

The end portion 30 of the inner driveshaft tube section 26 is received within the end portion 34 of the outer driveshaft tube section 28 in an overlapping or telescoping manner. Specifically, the end portion 34 of the outer driveshaft tube section 28 is disposed about the end portion 30 of the inner driveshaft tube section 26 so as to define an overlapped region 38. The overlapped region 38 can have any length L that is suitable for providing the collapsible driveshaft 18 with acceptable torque transmitting properties and collapsing properties. Preferably, the overlapped region 38 has a length L in the range of from about one and one-half inches to about ten inches, and more preferably from about one and one-half inches to about four and one-half inches.

Figure 4:
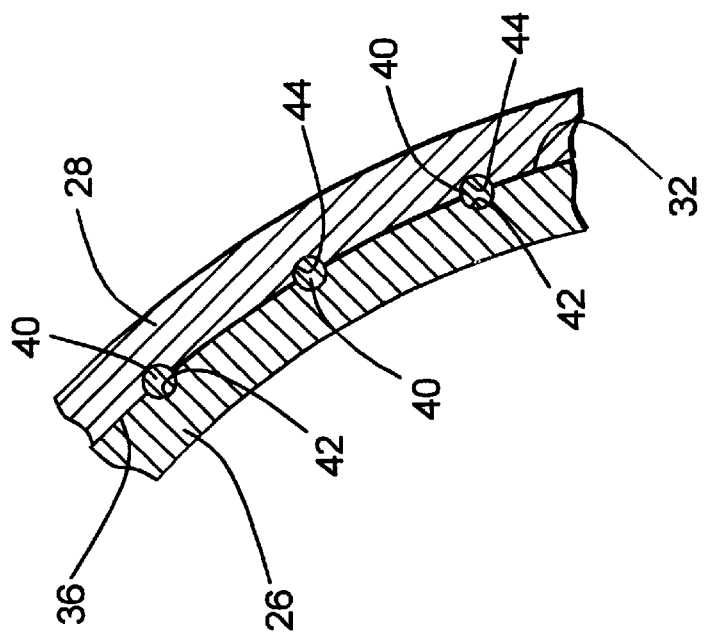
FIG. 4 is an enlarged sectional elevational view of a portion of the of the axially collapsible driveshaft assembly illustrated in FIG. 3.
Figure 3:
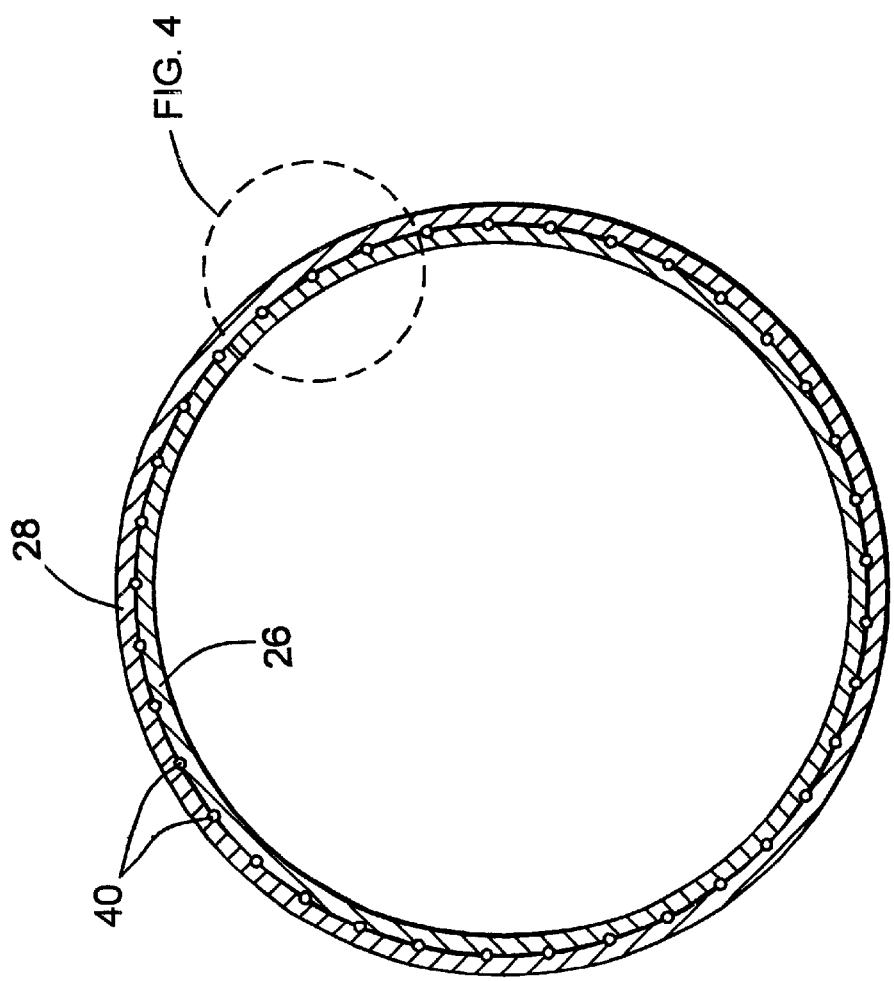
FIG. 3 is a sectional elevational view of the axially collapsible driveshaft assembly taken along line 3—3 of FIG. 2.

As shown in FIGS. 2, 3, and 4, at least one wire 40, and preferably a plurality of wires 40, is disposed between the outer surface 32 of the end portion 30 of the inner driveshaft tube section 26 and the inner surface 36 of the end portion 34 of the outer driveshaft tube section 28. The wires 40 are, in the preferred embodiment, relatively small solid cylindrical members that extend throughout at least some, but preferably all, of the overlapped region 38. However, as used herein, the term "wire" can refer to a member having any desired shape or size. In the illustrated embodiment, the wires 40 are aligned axially with the inner and outer driveshaft tube sections 26 and 28, respectively. It will be appreciated, however, that the wires 40 need not extend axially with the inner driveshaft tube section 26 and the outer driveshaft tube section 28. As best shown in FIG. 4, the wires 40 are received in recesses 42 and 44 respectively formed in the outer surface 32 of the end portion 30 of the inner driveshaft tube section 26 and in the inner surface 36 of the end portion 34 of the outer driveshaft tube section 28.

The wires 40 cooperate with the recesses 42 and 44 to prevent relative axial and rotational movement between the inner driveshaft tube section 26 and the outer driveshaft tube section 28 during normal operating conditions of the collapsible driveshaft 18. However, when a relatively large axial force is applied to the ends of the collapsible driveshaft 18, the inner driveshaft tube section 26 will move axially within the outer driveshaft tube section 28, thereby collapsing and absorbing energy. Such relative axial movement is accomplished by deformation of either or both of the inner driveshaft tube section 26 and the outer driveshaft tube section 28. Typically, the outer surface 32 of the inner driveshaft tube section 26 and the inner surface 36 of the outer driveshaft tube section 28 are both deformed at the axial ends of the recesses 42 and 44 during such relative axial movement of the inner and outer driveshaft tube sections 26 and 28, respectively.

As mentioned above, the wires 40 can be formed having any desired shape and size. For a typical driveshaft 18 having an outer diameter of approximately four inches, the wires 40 can preferably have a diameter within the range of from about 0.02 inch to about 0.09 inch, and more preferably from about 0.04 inch to about 0.06 inch. Preferably, the number of wires 40 disposed about the overlapped region 38 is within the range of from about eight to about ninety, and more preferably from about thirty to about fifty. For example, the inner driveshaft tube section 26 can be formed having an outer diameter of about four inches, and the collapsible driveshaft 18 includes about forty of the wires 40 equally spaced around the overlapped region 38.

The wires 40 can be formed from any material suitable to normally prevent relative axial and rotational movement between the inner driveshaft tube section 26 and the outer driveshaft tube section 28 during normal operating conditions of the collapsible driveshaft 18. Preferably, the wires 40 are formed from a hard metallic material, such as annealed stainless steel. If the wires 40 are formed from a different metal than one or both of the inner driveshaft tube section 26 and the outer driveshaft tube section 28, the wires 40 are preferably provided with a coating of an inert protective material, such as an organic material, to prevent galvanic corrosion of the metals used to form the inner driveshaft tube section 26 and the outer driveshaft tube section 28.

Figure 5:
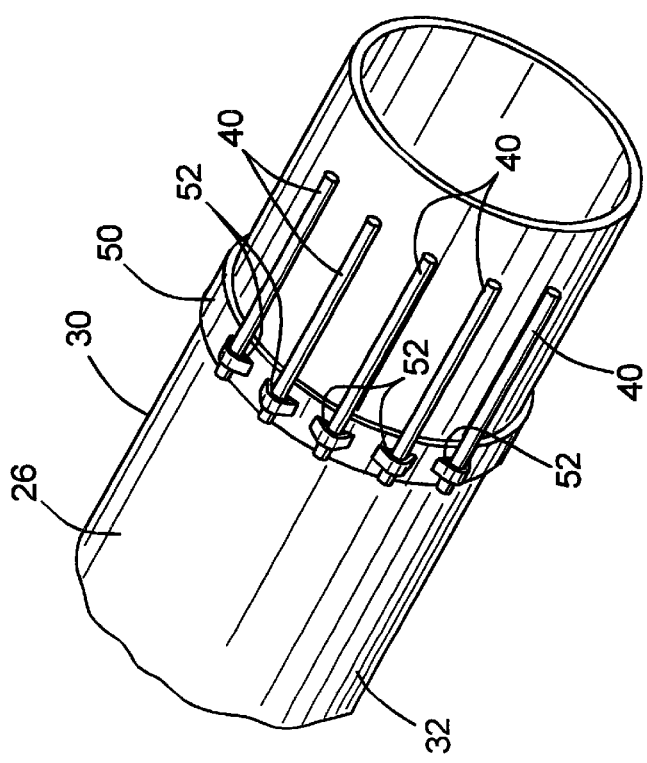
FIG. 5 is a perspective view of an end of a first driveshaft tube section having a plurality of wires disposed thereabout with a first embodiment of a wire retainer.

The collapsible driveshaft 18 can be manufactured by any suitable method. However, FIGS. 5 through 11 illustrate a preferred method for manufacturing the collapsible driveshaft 18 illustrated in FIGS. 1 through 4. As shown in FIG. 5, a plurality of the axially extending wires 40 is initially disposed about the outer surface 32 of the end portion 30 of the inner driveshaft tube section 26. Alternatively, the plurality of the axially extending wires 40 may be disposed about the inner surface 36 of the end portion 34 of the outer driveshaft tube section 28. In either event, the wires 40 can be manually positioned on the outer surface 32 of the inner driveshaft tube section 26 and retained thereon by any suitable means, such as adhesive or tape.

Figure 6:
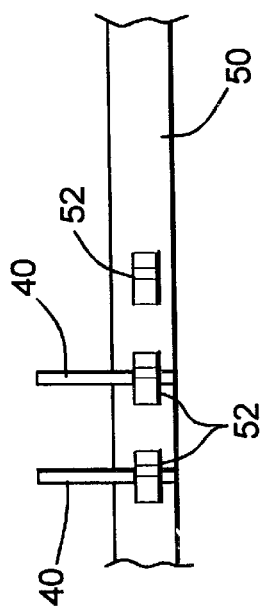
FIG. 6 is a top plan view of a portion of the first embodiment of the wire retainer illustrated in FIG. 5.
Figure 7:
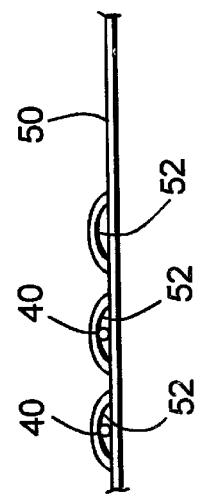
FIG. 7 is a end elevational view of a portion of the first embodiment of the wire retainer illustrated in FIGS. 5 and 6.
Figure 8:
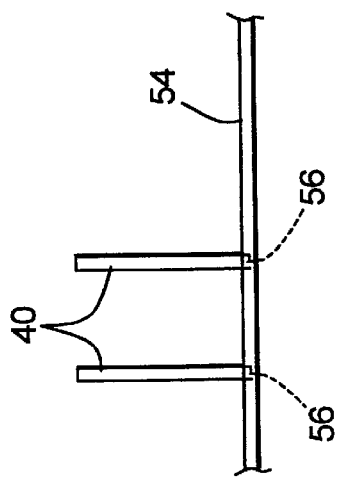
FIG. 8 is a top plan view of a portion of a second embodiment of the wire retainer.

However, it is preferred that the wires 40 be supported on a wire retainer, a first embodiment of which is illustrated at 50 in FIGS. 5, 6, and 7. As shown therein, the wire retainer 50 can be formed as a flat strip of material having a plurality of slots 52 formed therethrough. The slots 52 are sized to frictionally engage the ends of the wires 40 so as to support a plurality of such wires 40 thereon for ease of handling. The wire retainer 50 and wires 40 can then be wrapped about the end portion 30 of the inner driveshaft tube section 26 as shown in FIG. 5 to position the wires 40 thereabout. An alternative embodiment of a wire retainer 54 is illustrated in FIG. 8. As shown therein, the wire retainer 54 can be formed as a strip of material having a plurality of openings 56 formed therein. The openings 56 are sized to frictionally engage the ends of the wires 40 so as to support a plurality of such wires 40 thereon for ease of handling. The wire retainer 54 can then be wrapped about the end portion 30 of the inner driveshaft tube section 26 as shown in FIG. 5 to position the wires 40 thereabout. Instead of forming the wire retainers 50 and 54 as flat strips of material that are wrapped about the end portion 30 of the inner driveshaft tube section 26, it will be appreciated that the wire retainers 50 and 54 may be formed having an annular shape that corresponds in size with the outer diameter of the end portion 30 of the inner driveshaft tube section 26. The annular wire retainers 50 and 54 can then be quickly disposed about the end portion 30 of the inner driveshaft tube section 26.

Figure 9:
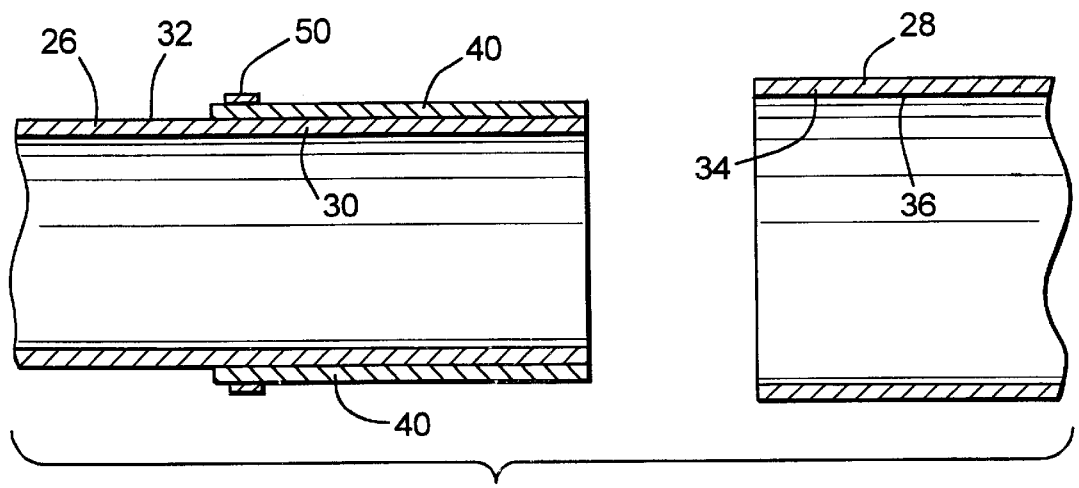
FIG. 9 is a sectional elevational view showing the components of the axially collapsible driveshaft assembly in an initial state of assembly.
Figure 10:
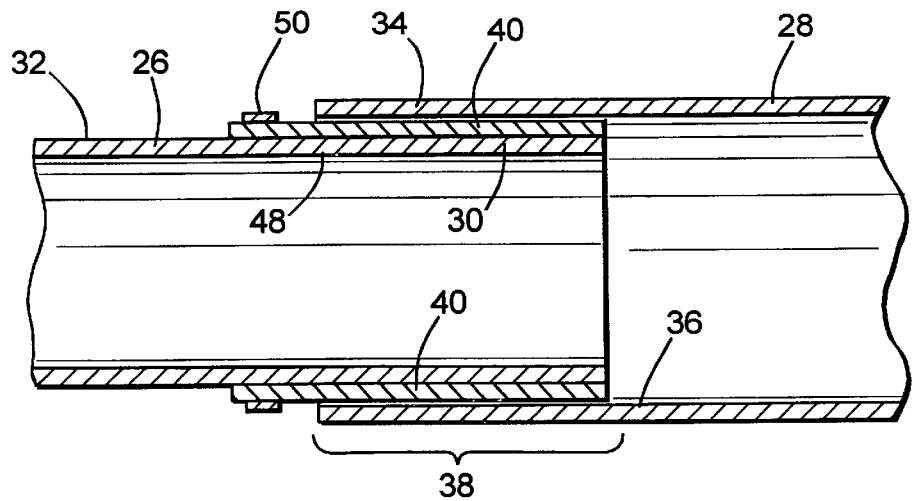
FIG. 10 is a sectional elevational view showing the components of the axially collapsible driveshaft assembly in an intermediate state of assembly.

As shown in FIGS. 9 and 10, after the wires 40 are positioned on the outer surface 30 of the end portion 30 of the inner driveshaft tube section 26, the end portion 34 of the outer driveshaft tube section 28 is disposed thereabout so as to define the overlapped region 38. To facilitate this movement of the outer driveshaft tube section 28, the inner surface 36 of the end portion 34 of the outer driveshaft tube section 28 is preferably formed to be at least slightly larger in diameter than an outer diameter defined by the outer surfaces of the wires 40 positioned on the outer surface 32 of the end portion 30 of the inner driveshaft tube section 26. This allows the end portion 34 of the outer driveshaft tube section 28 to be moved quickly and easily about the end portion 30 of the inner driveshaft tube section 26 without disturbing the wires 40 positioned thereon. As a result, a relatively small circumferential space is provided between the outer surfaces of the wires 40 and the inner surface 36 of the end portion 34 of the outer driveshaft tube section 28, as shown in FIG. 10.

Figure 11:
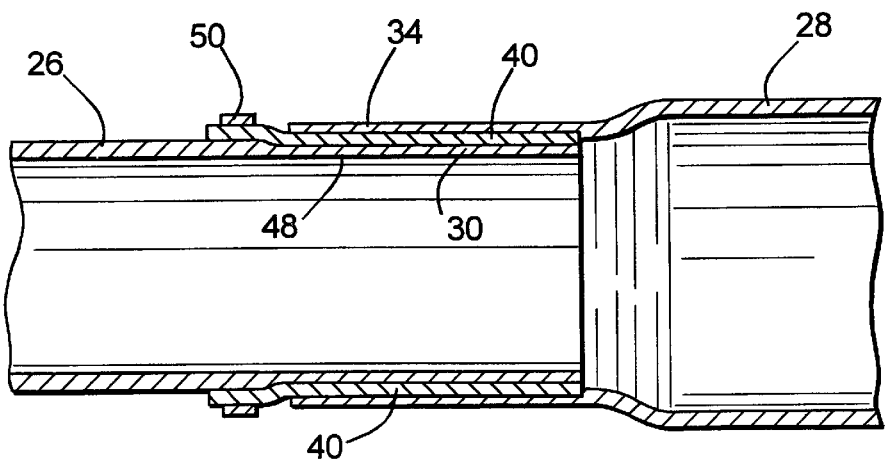
FIG. 11 is a sectional elevational view showing the components of the axially collapsible driveshaft assembly in a final state of assembly.

Then, as shown in FIG. 11, the end portion 34 of the outer driveshaft tube section 28 is then deformed inwardly into engagement with the wires 40 and the end portion 30 of the inner driveshaft tube section 26. Alternatively, the end portion 30 of the inner driveshaft tube section 26 can be deformed outwardly into engagement with the end portion 34 of the outer driveshaft tube section 28. If desired, the end portion 34 of the outer driveshaft tube section 28 can be deformed inwardly simultaneously as the end portion 30 of the inner driveshaft tube section 26 is deformed outwardly. In each instance, such deformation compresses the wires 40 between the inner surface 36 of the end portion 34 of the outer driveshaft tube section 28 and the outer surface 32 of the end portion 30 of the inner driveshaft tube section 26. As a result of such compression, the wires 40 (which are relatively incompressible) cause the recesses 42 and 44 described above to be formed in the inner surface 36 of the end portion 34 of the outer driveshaft tube section 28 and in the outer surface 32 of the end portion 30 of the inner driveshaft tube section 26.

This deformation can be accomplished by any suitable forming method, such as swaging, forming with a forming die, or magnetic pulse forming. Preferred methods involve compressing the end portion 30 of the outer driveshaft tube section 28 inwardly while supporting an inner surface 48 of the inner driveshaft tube section 26 with a mandrel (not shown). One type of swaging is rotary swaging, which employs a die which rotates around the overlapped region 38 of the driveshaft 18 while it alternately rapidly collapses and expands in the radial direction, much like a hammer, to compress the outer driveshaft tube section 28 about the inner driveshaft tube section 26. One type of forming die is a reducing die, in which the die has a tapered opening, and the driveshaft 18 is pushed into the opening to compress the driveshaft 18 at the overlapped region 38. In one type of magnetic pulse forming, an annular electromagnetic inductor coil is disposed about the overlapped region 38 of the driveshaft 18 and energized to generate a magnetic field for collapsing the end portion 34 of the outer driveshaft tube section 28 onto the end portion 30 of the inner driveshaft tube section 26.

In the embodiment shown in FIG. 11, the forming method involves compressing the outer driveshaft tube section 28 radially inwardly about the wires 40 and the inner driveshaft tube section 26 in the overlapped region 38. A mandrel (not shown) can be disposed inside the inner driveshaft tube section 26 to support the inner surface 48 of the inner driveshaft tube section 26. Compression of the outer driveshaft tube section 28 about the wires 40 causes the formation of indents or recesses 42 and 44 in the outer surface 32 of the inner driveshaft tube section 26 and the inner surface 36 of the outer driveshaft tube section 28, respectively.

Deformation of the inner and outer driveshaft tube sections 26 and 28 about the wires 40 allows the driveshaft 18 to transmit torque during operation of the vehicle. Preferably, the inner and outer driveshaft tube sections 26 and 28 are pressed together about the wires 40 to form an interference fit between the outer surface 32 of the inner driveshaft tube section 26 and the inner surface 36 of the outer driveshaft tube section 34. Such an interference fit allows the driveshaft 18 to transmit additional torque.

In an alternative manufacturing method, the end portion 34 of the outer driveshaft tube section 28 is initially disposed about the end portion 30 of the inner driveshaft tube section 26 so as to define the overlapped region 38. The inner driveshaft tube section 26 is formed to be somewhat smaller in diameter than the outer driveshaft tube section 28 so that an annular space is provided between the overlapping end portions 30 and 34, respectively. Then, the plurality of wires 40 can be inserted within the annular space. Preferably, an automated mechanism (not shown) is provided for inserting the wires 40 within this annular space. Lastly, either or both of the end portion 30 of the inner driveshaft tube section 26 and the end portion 34 of the outer driveshaft tube section 28 are deformed about the wires 40 in the manner described above.

In operation, the wires 40 and the recesses 42 and 44 cooperate to form a mechanical interlock between the inner driveshaft tube section 26 and the outer driveshaft tube section 28 that prevents relative axial and rotational movement therebetween during normal operating conditions. However, when a relatively large axial force is applied to the ends of the collapsible driveshaft 18, the inner and outer driveshaft tube sections 26 and 28 will deform and move axially relative to one another, thereby collapsing and absorbing energy.

Generally speaking, it is desirable to keep the axial collapse force of the driveshaft 18 as low as possible, i.e. at a value which is greater than the axial forces applied during normal vehicle operation plus an amount provided as a safety margin. The known collapsible driveshaft tube designs having swaged or bumped regions require axial forces ranging from about 27,000 pounds to about 37,000 pounds to collapse. In comparison, the axial forces required to collapse the collapsible driveshaft 18 of this invention can be about one-half to about one-third of the prior art values, or about 10,000 pounds to about 20,000 pounds. As such, the collapsible driveshaft 18 of this invention will collapse under lower axial forces, thereby absorbing these axial forces and better protecting the occupants of the vehicle.

The collapsible driveshaft 18 of the invention takes advantage of the low axial force associated with a splined connection while avoiding the high cost. It uses splines formed with wires 40 instead of more expensive machined or formed splines. The inner and outer driveshaft tube sections 26 and 28 are commercially available without requiring costly forming or machining operations. Axial collapse force and torque capacity can be altered by changing the diameter of the wires 40, the number of wires 40, and the length of the wires 40. Consequently, this design can be tuned to fit the vehicle's axial collapse force and torque capacity requirements.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A driveshaft comprising:
   an inner member including an end portion having an outer surface;
   an outer member including an end portion having an inner surface, said end portion of said outer member being disposed about said end portion of said inner member so as to define an overlapped region;
   a wire extending through said overlapped region and received in respective recesses formed in said outer surface of said inner member and said inner surface of said outer member to prevent relative axial and rotational movement between said inner member and said outer member during normal operating conditions; and
   a wire retainer supporting said wire on one of said inner member and said outer member, said wire retainer including a strip having one of a slot or a recess formed therein for supporting the wire thereon.

2. The driveshaft defined in claim 1 wherein said inner member is an inner driveshaft tube section and said outer member is an outer driveshaft tube section.

3. The driveshaft defined in claim 1 wherein said wire extends generally axially with the inner member and the outer member.

4. The driveshaft defined in claim 1 wherein a plurality of wires extends through said overlapped region, each of said wires being received in respective recesses formed in said outer surface of said inner member and said inner surface of said outer member.

5. The driveshaft defined in claim 4 wherein each of said wires extends generally axially with said inner member and said outer member.

6. The driveshaft defined in claim 5 wherein said wires are substantially equidistantly spaced apart about said inner member and said outer member.

7. The driveshaft defined in claim 1 wherein said wire is provided with a coating.

8. A driveshaft comprising:
   an inner member including an end portion having an outer surface;
   an outer member including an end portion having an inner surface, said end portion of said outer member being disposed about said end portion of said inner member so as to define an overlapped region;
   a wire extending through said overlapped region and received in respective recesses formed in said outer surface of said inner member and said inner surface of said outer member; and
   a wire retainer supporting said wire on one of said inner member and said outer member, said wire retainer including an annular member having one of a slot or a recess formed therein for supporting the wire thereon.

9. The driveshaft defined in claim 8 wherein said inner member is an inner driveshaft tube section and said outer member is an outer driveshaft tube section.

10. The driveshaft defined in claim 8 wherein said wire extends generally axially with the inner member and the outer member.

11. The driveshaft defined in claim 8 wherein a plurality of wires extends through said overlapped region, each of said wires being received in respective recesses formed in said outer surface of said inner member and said inner surface of said outer member.

12. The driveshaft defined in claim 11 wherein each of said wires extends generally axially with said inner member and said outer member.

13. The driveshaft defined in claim 12 wherein said wires are substantially equidistantly spaced apart about said inner member and said outer member.

14. The driveshaft defined in claim 8 wherein said wire is provided with a coating.

15. A driveshaft comprising:
   an inner member including an end portion having an outer surface defining an outer diameter, said outer surface having an axially extending recess formed therein;
   an outer member including an end portion having an inner surface defining an inner diameter that is greater than said outer diameter of said inner member, said inner surface having an axially extending recess formed therein, said end portion of said outer member being disposed about said end portion of said inner member such that said axially extending recess formed in said inner surface of said outer member is aligned with said axially extending recess formed in said outer surface of said inner member; and
   a wire disposed within said axially extending recess formed in said inner surface of said outer member and within said axially extending recess formed in said outer surface of said inner member, said wire cooperating with said inner member and said outer member to prevent relative axial and rotational movement between said inner member and said outer member during normal operating conditions, said wire being provided with a coating.

16. The driveshaft defined in claim 15 wherein said inner member is an inner driveshaft tube section and said outer member is an outer driveshaft tube section.

17. The driveshaft defined in claim 15 wherein a plurality of wires is disposed in respective aligned recesses formed in said outer surface of said inner member and said inner surface of said outer member.

18. The driveshaft defined in claim 17 wherein each of said plurality of wires extends generally axially with said inner member and said outer member.

19. The driveshaft defined in claim 17 wherein said wires are substantially equidistantly spaced apart about said inner member and said outer member.

* * * * *